United States Patent
Kölhi et al.

(10) Patent No.: US 11,962,482 B2
(45) Date of Patent: Apr. 16, 2024

(54) SYSTEMS AND METHODS FOR MAINTAINING VIDEO QUALITY USING DIGITAL TWIN SYNTHESIS

(71) Applicant: Rovi Guides, Inc., San Jose, CA (US)

(72) Inventors: Johan Kölhi, Vaxholm (SE); Anthony Friede, Upplands Väsby (SE)

(73) Assignee: Rovi Guides, Inc., San Jose, CA (US)

( * ) Notice: Subject to any disclaimer, the term of this patent is extended or adjusted under 35 U.S.C. 154(b) by 97 days.

(21) Appl. No.: 17/864,517

(22) Filed: Jul. 14, 2022

(65) Prior Publication Data

US 2024/0022489 A1 Jan. 18, 2024

(51) Int. Cl.
H04L 43/0852 (2022.01)
G06V 40/20 (2022.01)
H04L 43/16 (2022.01)
H04L 65/403 (2022.01)

(52) U.S. Cl.
CPC .......... H04L 43/0852 (2013.01); G06V 40/20 (2022.01); H04L 43/16 (2013.01); H04L 65/403 (2013.01)

(58) Field of Classification Search
CPC ... H04L 41/0852; H04L 43/16; H04L 65/403; G06V 40/16
USPC ................................................. 709/223, 224
See application file for complete search history.

(56) References Cited

U.S. PATENT DOCUMENTS

| | | | |
|---|---|---|---|
| 8,064,515 B2 | 11/2011 | Reynolds et al. | |
| 8,675,733 B2 | 3/2014 | Mabey et al. | |
| 9,548,048 B1 * | 1/2017 | Solh | G06V 40/20 |
| 10,887,550 B2 * | 1/2021 | Coghlan | G06F 16/587 |
| 11,277,304 B1 * | 3/2022 | Thomas | H04L 43/0829 |
| 11,714,595 B1 * | 8/2023 | Libin | H04S 7/305 704/235 |
| 2002/0118796 A1 * | 8/2002 | Menard | H04L 63/08 379/90.01 |
| 2004/0010720 A1 * | 1/2004 | Singh | H04H 60/95 709/224 |
| 2005/0243166 A1 * | 11/2005 | Cutler | H04N 7/15 348/E7.083 |
| 2005/0243167 A1 * | 11/2005 | Clarke | H04N 7/147 348/14.07 |
| 2005/0243168 A1 * | 11/2005 | Cutler | H04N 7/147 348/E7.081 |
| 2009/0063675 A1 * | 3/2009 | Faris | H04L 67/01 709/224 |

(Continued)

FOREIGN PATENT DOCUMENTS

WO 2017055609 A1 4/2017

*Primary Examiner* — Thu Ha T Nguyen
(74) *Attorney, Agent, or Firm* — Haley Guiliano LLP

(57) ABSTRACT

At least one high-quality image of a speaker is captured. A low network quality condition may be detected between a client device and a video service node. In response to detecting the low network quality condition, a data stream comprising changes to the high-quality image of the speaker needed to recreate a representation of the speaker is generated. Transmission of the video stream of the speaker between the client device of the speaker and the video service node is stopped and, simultaneously, transmission of the data stream is begun. A digital twin of the speaker is then generated for display at the client device based on the data stream and the high-quality image of the speaker.

22 Claims, 8 Drawing Sheets

(56) References Cited

U.S. PATENT DOCUMENTS

| | | | |
|---|---|---|---|
| 2009/0300520 A1* | 12/2009 | Ashutosh | H04L 12/1831 715/756 |
| 2010/0235472 A1* | 9/2010 | Sood | H04L 67/06 709/224 |
| 2012/0056971 A1* | 3/2012 | Kumar | H04M 3/567 348/E7.083 |
| 2013/0222386 A1* | 8/2013 | Tannhauser | H04N 9/3147 345/428 |
| 2014/0156833 A1* | 6/2014 | Robinson | H04L 43/12 709/224 |
| 2014/0194152 A1* | 7/2014 | Liu | H04M 3/5315 455/466 |
| 2014/0195675 A1* | 7/2014 | Silver | H04L 65/611 709/224 |
| 2015/0358368 A1* | 12/2015 | Wiseman | H04L 65/65 709/204 |
| 2016/0119582 A1* | 4/2016 | Smurro | G16H 80/00 348/14.08 |
| 2017/0374118 A1* | 12/2017 | Pevzner | H04L 65/75 |
| 2018/0113577 A1* | 4/2018 | Burns | H04N 21/47217 |
| 2018/0255114 A1* | 9/2018 | Dharmaji | G06F 16/435 |
| 2018/0352156 A1* | 12/2018 | Garrido | H04L 65/1083 |
| 2018/0352303 A1* | 12/2018 | Siddique | H04L 65/1069 |
| 2021/0136127 A1* | 5/2021 | Ghanaie-Sichanie | H04L 65/1069 |
| 2021/0250195 A1* | 8/2021 | Baker | H04L 12/1827 |
| 2021/0313077 A1* | 10/2021 | Smurro | G16H 50/20 |
| 2021/0320854 A1* | 10/2021 | King, V | H04L 43/0817 |
| 2021/0390970 A1* | 12/2021 | Zhang | G06V 40/171 |
| 2022/0152497 A1* | 5/2022 | Huke | A63F 13/358 |
| 2022/0368685 A1* | 11/2022 | Pollack | H04L 65/1093 |
| 2022/0408157 A1* | 12/2022 | Siddique | H04N 7/15 |
| 2023/0055046 A1* | 2/2023 | Whited | H04L 47/122 |
| 2023/0067793 A1* | 3/2023 | Agrawal | G08B 5/22 |
| 2023/0068413 A1* | 3/2023 | Agrawal | G11B 20/10527 |
| 2023/0119205 A1* | 4/2023 | Agrawal | H04N 7/147 348/14.03 |
| 2023/0140607 A1* | 5/2023 | Agrawal | H04L 65/403 709/204 |
| 2023/0290096 A1* | 9/2023 | Ng-Thow Hing | G06T 13/40 |

* cited by examiner

SYSTEMS AND METHODS FOR MAINTAINING VIDEO QUALITY USING DIGITAL TWIN SYNTHESIS

BACKGROUND

This disclosure is directed to maintaining streaming video quality. In particular, techniques are disclosed for transitioning from video of a person speaking (hereinafter, the "speaker") to a digital twin of the speaker.

This disclosure details a novel method for enabling data networks, service providers and streaming video applications to automatically synthesize and replace degraded and/or corrupted video streams in real time in order to maintain information fidelity and uninterrupted, high-quality content delivery to, and between, all participants.

SUMMARY

With the recent and dramatic increase in dependence upon real-time audio and video streaming services for both private and professional communications, combined with the massive shift towards remote- and distributed-working arrangements, the stability, quality and effectiveness of these services have become critically important for most organizations, businesses, government services and private individuals worldwide. Unfortunately, overburdened networks, unstable connections and intermittent disruptions in service quality between even a few participants of multi-party real-time communications can severely degrade the utility, intelligibility and value of these services for all participants. By automatically synthesizing and bridging past the sources of disruptions of partially or completely disrupted, degraded and/or corrupted real-time video streams via the digital twin synthesis methodology, it is possible for communications service providers to ensure significantly higher-quality service delivery, stability and end-to-end communications fidelity than is currently possible via the disruption-mitigation strategies in use today.

The two most common strategies of existing solutions for mitigating network instability are buffering and bandwidth restriction. With buffering, delays are inserted into the playback of each video stream in order to help hide small disturbances such as moderate jitter or a small number of dropped data packets occurring infrequently. Bandwidth restriction involves reducing bandwidth consumption via lower-quality video codecs and reduced video resolution in response to network congestion (reducing available network speeds) and varying network conditions. While both strategies can provide a degree of relief during relatively mild disruptions, neither of these strategies is particularly effective for delivering uninterrupted, high-quality real-time video communications to end users through sustained network disturbances and interruptions. Further, during instances when these disturbances and disruptions become more severe, such as during significant communications instability with sustained packet losses, heavy jitter, and/or drastically reduced available bandwidth, neither strategy can effectively cope, resulting in corrupted and frozen video streams between participants, dropped connections and complete application crashes. It is primarily with respect to mitigating the negative effects of these situations of significant and/or sustained disruptions that this disclosure is focused.

This disclosure provides an ability for networking and communications service providers, equipment manufacturers and end-user applications to gain the ability to proactively and automatically mitigate sources of significant and intermittent or ongoing losses of communications fidelity. This is achieved by utilizing this disclosure's digital twin synthesis techniques to create very high quality and exceptionally low bandwidth (up to 95% data reduction) 100% synthesized video streams on the fly for the duration of each stream's communications disruption/disturbance.

Through the implementation of this disclosure's systems and methods, digital twin synthesis-enabled applications (apps) and network nodes can transition on the fly from broadcasting and receiving video streams via traditional networking standards (codecs) to temporarily broadcasting and receiving one or more video streams that are 100% synthesized via the digital twin synthesis algorithms as detailed below. The replacement of live video streams with 100% synthesized versions is designed to be temporary, automatic, and completely transparent to end-users. The temporary switchover to, and synthesis of, these video streams in response to network errors and communications instability occurs automatically between synthesis-enabled network nodes, communications services and/or end-user applications as a significantly higher-quality alternative to the primarily bandwidth-focused disruption-mitigation measures employed by traditional video streaming applications and standards.

When a synthesis-enabled network node or application detects an unacceptable level of network jitter, insufficiently buffered video contents or communications instability, it will send a request into the network to switch over to the synthesis communication method. Upon confirmation from the most distant synthesis-enabled communication node or application, the originating node or application will transmit the highest-quality intra frame image stored within its video buffer or local cache as well as user-specific contextual data, to be used as the originating information from which all future video synthesis is to be generated.

In order prepare video streams for digital twin synthesis, appropriately high-quality images of each originating speaker must be identified, analyzed, tagged and stored. This is performed by AI analysis of each of the stream's initial intra frame (I-frame) images until appropriate images are identified and the speaker's movement tendencies and emotive tendencies are identified. The following intra frame images are further analyzed for quality and suitability before the final images are selected by the algorithm and stored for use. Multiple factors affect the algorithm's final decisions, including image focus, lightning conditions, movement, rotation, partially hidden faces, etc. Optional AI analyses can be further performed during the stream's connections to improve upon existing features or for the addition of desired new capabilities.

Following this high-quality image transmission, all following data transmissions from that application or node for the duration of the communications disturbance will consist solely of the real-time audio for that communications stream. The receiving (synthesizing) nodes and/or applications will then channel this real-time audio stream into this application's customized video synthesis algorithms in order to create compelling and high-fidelity, yet 100% synthetic, real-time digital twins of the degraded or corrupted video stream for local display and/or further broadcast.

The primary goal of this process is for each rendered digital twin to be so similar in appearance and manner to the originating human's appearance and manner as to feel like a natural and normal communications surrogate to the majority of recipients for the duration of the network disruption/instability. In order to simplify the process of incorporating these capabilities into both existing and future streaming video solutions, it is recommended for the digital twin synthesis algorithms to be implemented as communications codecs alongside each platform's existing codec packages.

Systems and methods are described herein for maintaining a video stream in a low network quality environment using a digital twin. At least one high-quality image of a speaker is captured. This may be accomplished by extracting one or more I-frames or keyframes from a video stream of the speaker. This may be repeated periodically to ensure that the image used is a recent image and to reduce suddenness when transitioning between the video stream and the digital twin of the speaker. Alternatively, the speaker may provide an image of themself. A low network quality condition may be detected between a client device and a video service node. For example, the client device may determine that latency of the video stream exceeds a threshold level, or that a network speed, bandwidth of the connection between the client device and the video service node, or buffer depth of the client device is below a threshold level. Alternatively or additionally, the video service node may monitor connections with each client device to determine the quality of each connection. In response to detecting the low network quality condition, a data stream is generated comprising changes to the high-quality image of the speaker needed to recreate a representation of the speaker. Transmission of the video stream of the speaker between the client device of the speaker and the video service node is stopped and, simultaneously, transmission of the data stream is begun. A digital twin of the speaker is then generated for display at the client device based on the data stream and the high-quality image of the speaker.

The digital twin can be rendered by the video service node or by individual client devices. If the low network quality condition affects upstream transmissions from a client device, the client device can transmit a data stream in place of video data and the video service node can generate the digital twin for inclusion in a video stream of all participants transmitted to each other client device. Alternatively, the video service node can forward the high-quality image and data stream to each other client device for rendering of the digital twin. If the low network quality condition affects downstream transmissions from the video service node to a client device, the video service node can request high-quality images and data streams from other client devices for transmission to the affected client device for rendering of digital twins.

The data stream used to generate the digital twin may be based on movement data for the speaker. The movement data, including gross movements such as gestures, and fine movements such as facial expression and mouth movements, is captured for the speaker. A range of physical movements, based on the movement data, is then stored for the speaker. The data stream can then be generated based on either the captured movement data or the stored range of physical movements for the speaker. This may enable digital twin synthesis even when no video stream is available for the speaker, such as when the speaker is dialed in to a conference call on an audio-only line, and the stored movement data or range of physical movements can be used along with an image of the speaker to generate a lip-synced digital twin.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
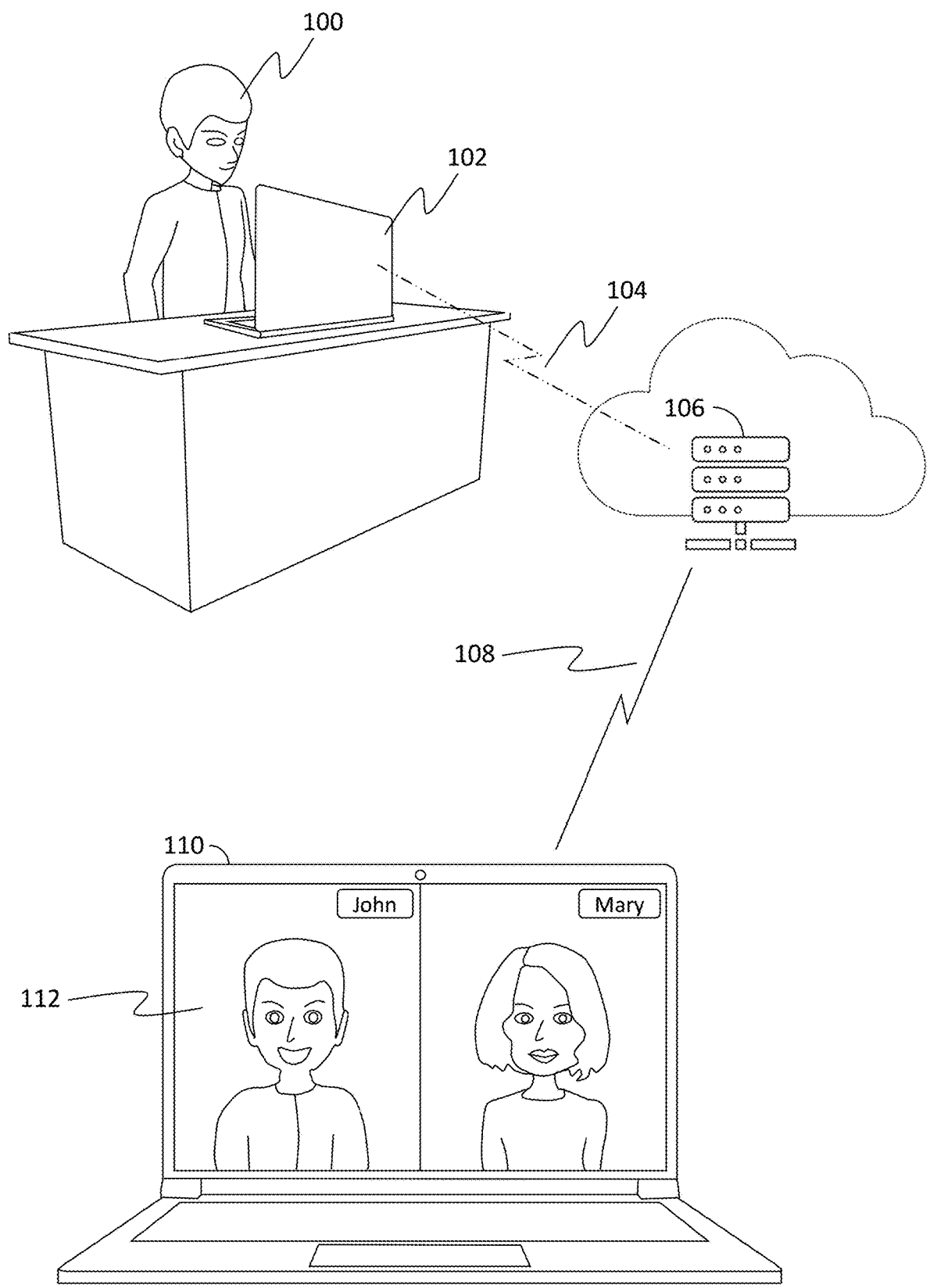
FIG. 1 shows an example environment in which digital twin synthesis is used to maintain video quality, in accordance with some embodiments of the disclosure.

FIG. 1 shows an example environment in which digital twin synthesis is used to maintain video quality, in accordance with some embodiments of the disclosure. User 100 may be participating in a video call using user device 102. User device 102 transmits audio and video data over communication path 104 to video service node 106. The network connection of communication path 104 may not have sufficient bandwidth or data transmission rates to transmit both audio and video data of user 100 (i.e., low network quality conditions). Upon detecting this condition, user device 102 retrieves a high-quality image of user 100, either captured from a camera of user device 102, extracted from video intended for transmission to video service node 106, or stored locally on user device 102. User device 102 tracks movements of the user, including mouth movements during speech, gestures, and the like, and generates a data stream comprising only the data necessary to simulate a likeness of user 102 from the high-quality image. User device 102 then stops transmission of the video of user 100 and instead transmits the data stream to video service node 106. User device 102 may also transmit the high-quality image to video service node 106. Alternatively, video service node 106 may extract an image from video data received from user device 102 prior to the start of the network condition.

Video service node 106 may use the high-quality image and the data stream received from user device 102 to generate a video stream comprising a digital twin of user 100. The digital twin is similar to "deep fake" simulations, resulting in a lifelike recreation of user 100. Video service node 106 then transmits, over communication path 108, the generated video of the digital twin, along with video from any other participants in the video call, to other user devices, such as user device 110. User device 110 then displays the generated video 112 of user 100 in place of live video from user device 102. When the network conditions improve, user device 102 may transition back to live video, and video 112 displayed on user device 110 will be replaced seamlessly with the live video from user device 102.

Figure 2:
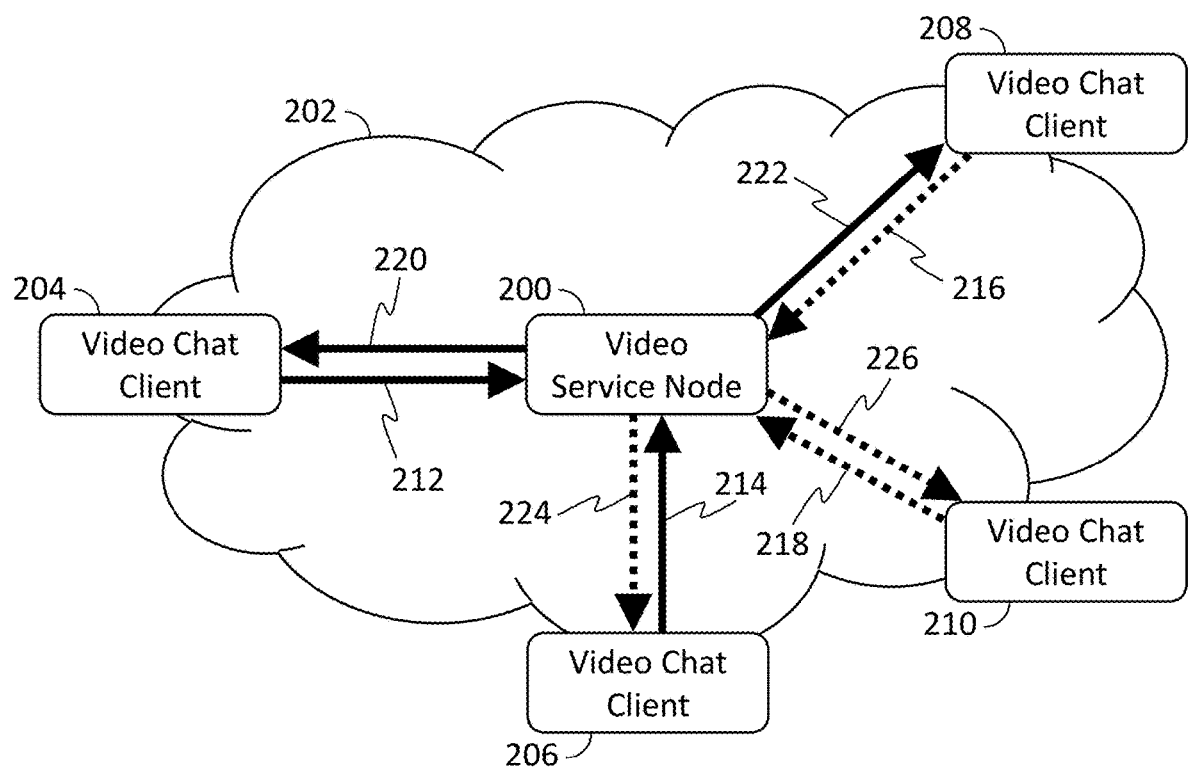
FIG. 2 is a diagram illustrating video stream and digital twin dataflows between a video service node and client devices experiencing different network quality conditions, in accordance with some embodiments of the disclosure.

FIG. 2 is a diagram illustrating video stream and digital twin dataflows between a video service node and client devices experiencing different network quality conditions, in accordance with some embodiments of the disclosure. Video service node 200 serves video conference calls for video chat clients in communication network 202 (e.g., the Internet, a local area network (LAN), wide area network (WAN), etc.) The quality of network connection between each client device may differ. Network connection quality between video service node 200 and video chat client 204 may be high, enabling fast transmission of data both upstream and downstream between them, while the network connection quality between video service node 200 and each of video chat clients 206, 208, and 210 may be lower, affecting data transmission rates in at least one direction. The reduced network connection quality may disrupt transmission of video content in the affected direction, as transmission of video content often consumes large amounts of network resources.

Each video chat client transmits to video service node 200 video and audio data of the participating user of each respective user device. Video chat clients 204 and 206, which experience no upstream network quality issues, transmit 212, 214 a media stream containing both video and audio data to video service node 200. Video chat clients 208 and 210 each experience low network quality conditions affecting upstream transmissions to video service node 200. Video chat clients 208 and 210 therefore generate a data stream for use in digital twin synthesis and transmit 216, 218 an audio stream and the data stream to video service node 200.

Video chat clients 204 and 208 experience no network quality conditions affecting downstream transmissions from video service node 200. Video service node 200 therefore transmits 220, 222 audio and video data for each other video chat client to video chat clients 204 and 208. Video service node 200 may generate and render video of digital twins for speakers using video chat clients 208 and 210 for transmission to video chat clients not experiencing downstream connection issues, such as video chat clients 206 and 210.

Video service node 200 generates a data stream for each incoming video stream for use in digital twin synthesis then transmits 224, 226 the data stream(s) to video chat clients 206 and 210 that experience low network quality conditions affecting downstream transmissions from video service node 200. Video chat clients 206 and 210 can generate and render digital twins for each other speaker. Video service node 200 may detect the network conditions affecting downstream communications between video service node and video chat clients. Alternatively, affected video chat clients may request the data from video service node 200.

Video service node 200 may determine whether any video chat clients are not enabled to generate digital twins. If any video chat client is not enabled, video service node 200 may generate a digital twin for any user whose video chat client is transmitting a data stream instead of a video stream. Video service node 200 then renders the digital twin in a video stream for transmission to the non-enabled video chat client(s).

Figure 3:
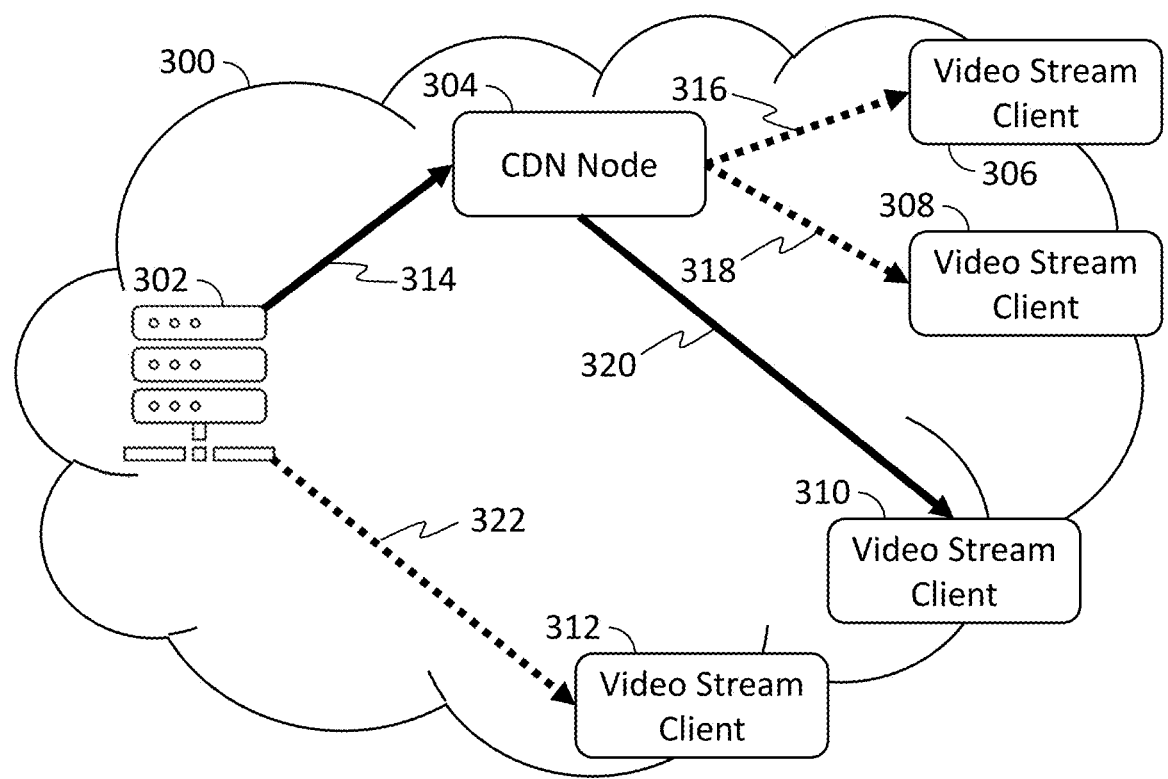
FIG. 3 is a diagram illustrating video stream and digital twin dataflows in a content delivery network when some client devices experience low network quality conditions, in accordance with some embodiments of the disclosure.

These techniques are not limited to video chat environments and can be applied to "talking head" segments of any video content. FIG. 3 is a diagram illustrating video stream and digital twin dataflows in a content delivery network when some client devices experience low network quality conditions, in accordance with some embodiments of the disclosure. Content delivery network (CDN) 300 includes a video server 302, which stores pre-recorded video content. CDN node 304 is responsible for serving the video content to client devices in a particular geographic area. For example, video stream clients 306, 308, and 310 are geographically close to CDN node 304 and are thus served content by CDN node 304. Video stream client 312 may be geographically located closest to video server 302 and may therefore be served video content directly from video server 302.

Video server 302 transmits 314 video content to CDN node 304 for distribution to video stream clients requesting the video content (e.g., video stream clients 306, 308, and 310). CDN node 304 may analyze video content requested by video stream clients and determine if there is a portion of the video stream that can be recreated through use of a digital twin, such as a "talking head" segment. If so, CDN node 304 captures one or more I-frames or keyframes of the segment and generates a data stream comprising data needed to generate a digital twin of the speaker in the segment. If there are client devices, such as video stream clients 306 and 308, that are experiencing a low network quality condition affecting downstream transmissions from CDN node 304, CDN node 304 transmits 316, 318 the data stream instead of the video data. This results in a higher overall video quality at video stream clients 306 and 308 since they are receiving minimal data and rendering a digital twin of the speaker, rather than receiving a downgraded or downconverted version of the video or experiencing buffering delays or other video disruptions (e.g., jitter, pixelation, etc.). Video stream client 310 may not experience adverse network conditions and therefore receives 320 the video stream from CDN node 304. Video server 302 is also enabled to generate the data stream needed to render a digital twin. Video stream client 312 may experience low network quality conditions affecting transmissions from video server 302. Video server 302 therefore transmits 322 the data stream instead of the video data.

Figure 4:
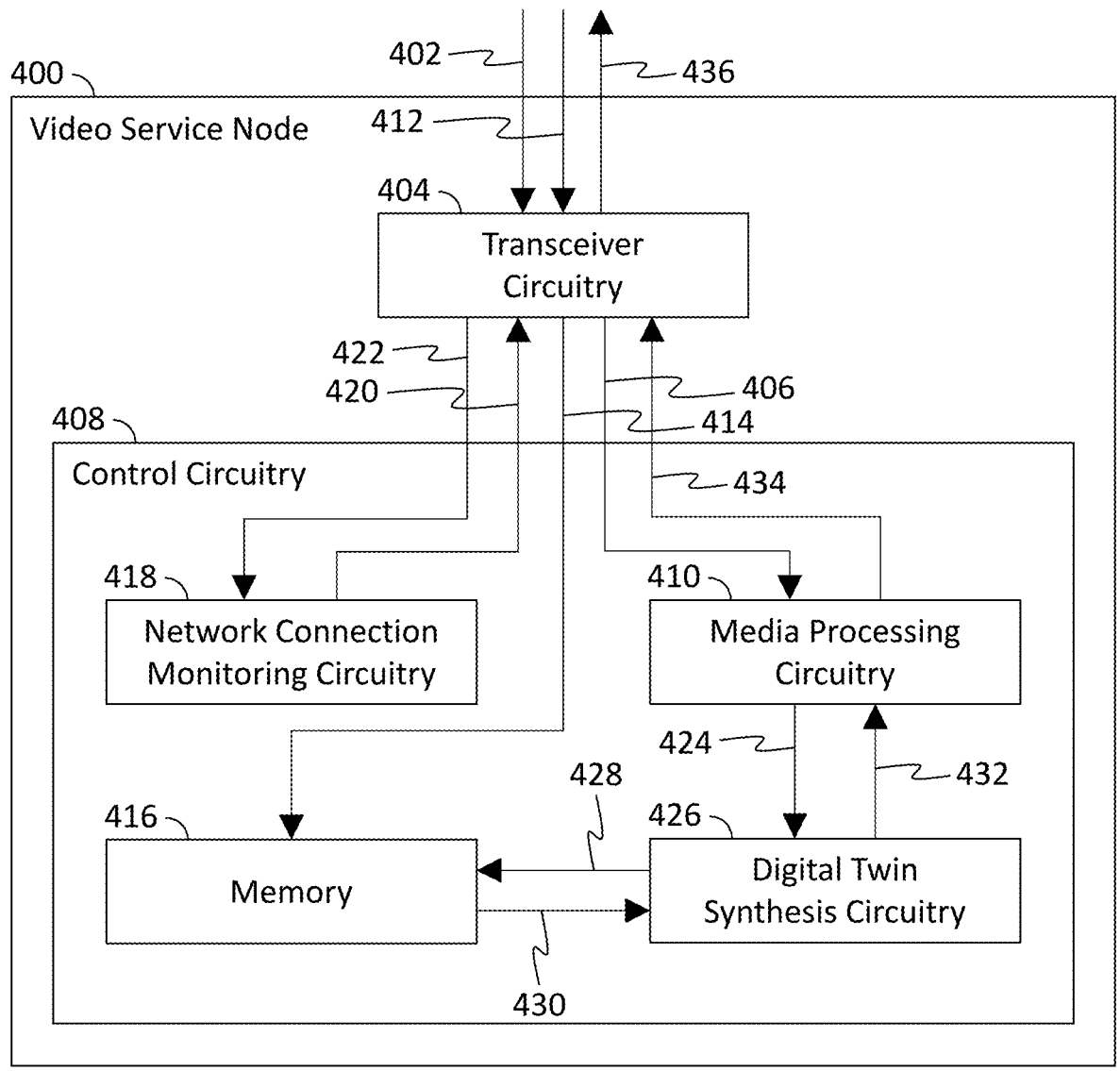
FIG. 4 is a block diagram showing components and dataflow therebetween of a video service node configured for digital twin synthesis, in accordance with some embodiments of the disclosure.

FIG. 4 is a block diagram showing components and dataflow therebetween of a video service node configured for digital twin synthesis, in accordance with some embodiments of the disclosure. Video service node 400 receives 402 video and audio data from a user device, such as a video chat client device, using transceiver circuitry 404. Transceiver circuitry 404 comprises a network connection over which data can be transmitted to and received from remote devices, such as an ethernet connection, Wi-Fi connection, mobile broadband interface, or connection employing any other suitable networking protocol. Transceiver circuitry 404 transmits 406 the video and audio data to control circuitry 408, where it is received at media processing circuitry 410. Control circuitry 408 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Media processing circuitry 410 encodes the incoming video and audio data for each participant in a video chat into a combined stream for transmission to each video chat client device participating in the video chat. Unless directed otherwise by control circuitry 408, media processing circuitry 410 transmits, via transceiver circuitry 404, the encoded audio and video to each participating video chat client device.

Video service node 400 also receives 412, using transceiver circuitry 404, a high-quality image of the user, or speaker, participating via the user device. Transceiver circuitry 404 transmits 414 the image to control circuitry 408 for storage in memory 416. Memory 416 may be an electronic storage device. As referred to herein, the phrase "electronic storage device" or "storage device" should be understood to mean any device for storing electronic data, such as random-access memory, read-only memory, hard drives, optical drives, solid state devices, quantum storage devices, or any other suitable fixed or removable storage devices, and/or any combination of the same. In some embodiments, media processing circuitry 410 extracts, once or periodically, an I-frame or keyframe of video received from a user device for storage in memory 416 as the high-quality image associated with the user device.

Video service node 400 may monitor network connections with each video chat client device. For example, network connection monitoring circuitry 418 may evaluate connection parameters of connections with each video chat client device. Network connection monitoring circuitry 418 may transmit 420 a request to transceiver circuitry 404 for data describing one or more connections. Transceiver circuitry 404 may, for example, transmit a ping to each video chat client device and measure an elapsed time between transmission and receipt of an acknowledgement from the video chat client device. Alternatively or additionally, each video chat client device may transmit to video service node 400, or include in media stream data, information regarding connection speed, bandwidth, or other network conditions. Network connection monitoring circuitry 418 receives 422 the data describing the connections and may compare one or more parameters of a connection with one or more corresponding thresholds. For example, network connection monitoring circuitry 418 may compare the upload connection speed of a video chat client device to a threshold connection speed required to maintain smooth video of the participant using the video chat client device.

If network connection monitoring circuitry 418 determines, based on the data received describing the connection of a video chat client device, that the connection of a video chat client device is experiencing network conditions that adversely affect the quality of media being received from the video chat client device, control circuitry 408 determines that a digital twin of the participant using the video chat client device should be generated. Control circuitry 408 instructs media processing circuitry 410 to transmit 424 received media data from the video chat client device to digital twin synthesis circuitry 426. Digital twin synthesis circuitry 426 may request 428 stored images received from the video chat client device from memory 416. Digital twin synthesis circuitry 426 receives 430 at least one image in response to the request. Digital twin synthesis circuitry 426 uses the image as a basis for generating the digital twin. For example, digital twin synthesis circuitry 426 may generate vectors describing different portions of the image, such as the participant's mouth, eyes, etc. Digital twin synthesis circuitry 426 then generates a set of vector modifications for each portion of the image to recreate an approximation of the participant's appearance. Digital twin synthesis circuitry 426 may use audio data received from media processing circuitry 410 to determine the participant's appearance based on past video data. For example, digital twin synthesis circuitry 426 may receive media data from media processing circuitry 410 during times when a digital twin is not needed for the participant. During these times, digital twin synthesis circuitry 426 may analyze how each portion of the participant's appearance changes based on speech, inflection, emotion, etc., and may store these changes in association with images of the participant and audio characteristics of the participant during each change.

Digital twin synthesis circuitry 426 modifies the image of the participant by modifying each vector in accordance with the speech of the participant. Digital twin synthesis circuitry 426 then renders video frames comprising modified versions of the image to create a video stream that approximates the appearance of the participant. Digital twin synthesis circuitry 426 transmits 432 the rendered video to media processing circuitry 410. Media processing circuitry 410 then combines the rendered video stream with audio data received from the participant into a single media stream. Media processing circuitry 410 transmits 434 the media stream to transceiver circuitry 404, which in turn transmits 436 the media stream to each video chat client device participating in the video chat.

If network connection monitoring circuitry 418 determines, based on the data received describing the connection of a video chat client device, that the connection of a video chat client device is experiencing network conditions that adversely affect the quality of media being transmitted to the video chat client device, control circuitry 408 determines that a digital twin data stream should be transmitted to the video chat client device due to the reduced data transmission requirements when compared to a video stream.

Digital twin synthesis circuitry 426 generates a data stream of the vector modifications or other type of modifications to the image of the participant used to generate the digital twin. The data stream is synchronized with audio data received from the participant. Digital twin synthesis circuitry 426 transmits 432 the data stream to media processing circuitry 410. Media processing circuitry 410 encodes the audio data from the participant and the data stream from digital twin synthesis circuitry 426 into a single media stream. Media processing circuitry 410 then transmits 434 the media stream to transceiver circuitry 404, which in turn transmits 436 the media stream to each video chat client device participating in the video chat. Each video chat client device then renders the digital twin of the participant based on the data stream and outputs video of the digital twin simultaneously with output of the audio data from the media stream.

Figure 5:
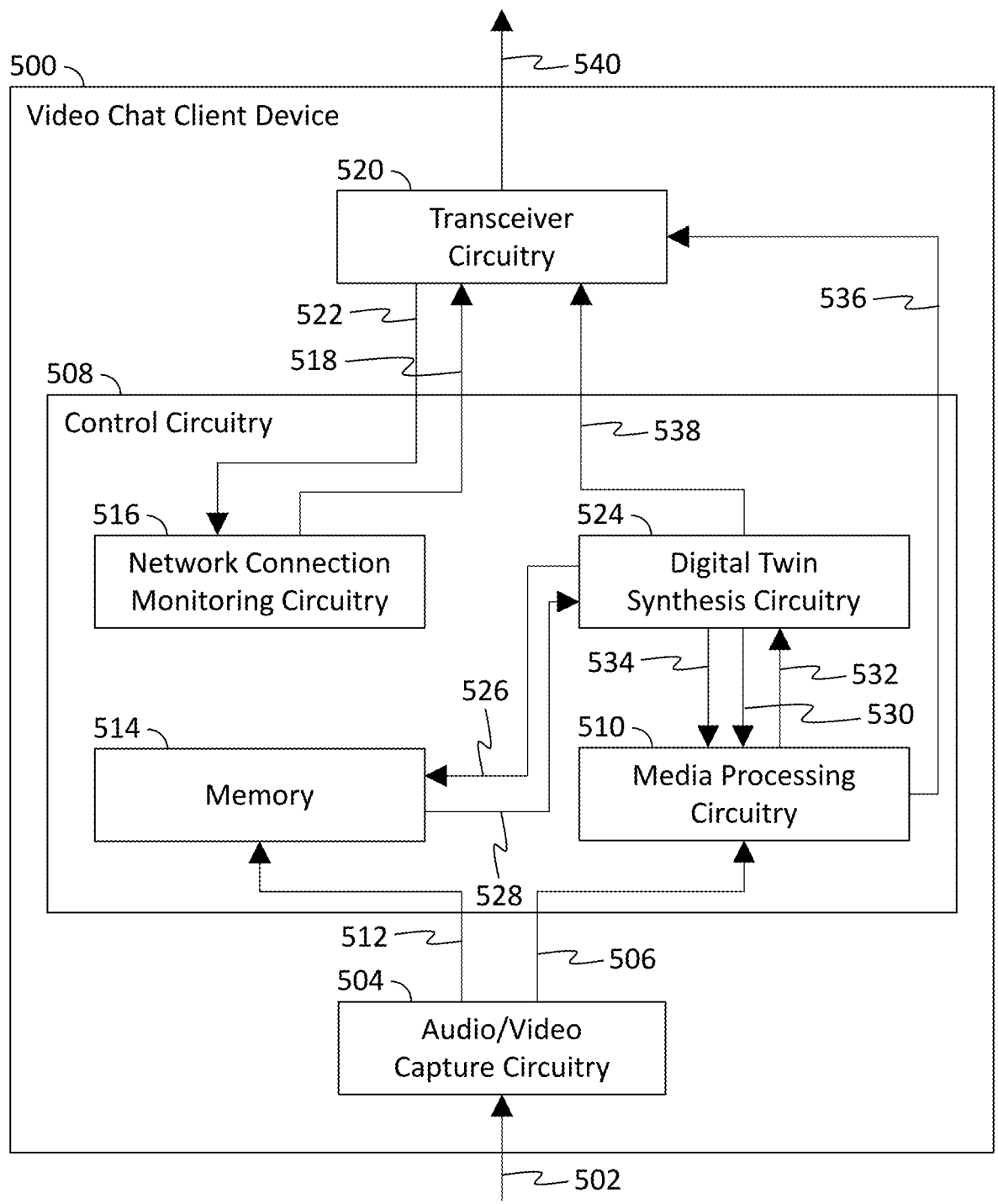
FIG. 5 is a block diagram showing components and dataflow therebetween of a video chat client device configured for digital twin synthesis, in accordance with some embodiments of the disclosure.

FIG. 5 is a block diagram showing components and dataflow therebetween of a video chat client device configured for digital twin synthesis, in accordance with some embodiments of the disclosure. Video chat client device 500 captures 502 audio and video of the participant using audio/video capture circuitry 504. For example, audio/video capture circuitry may be a camera and/or microphone connected to video chat client device 500. Audio/video capture circuitry may be separate from, or integral to, video chat client device 500. Audio/video capture circuitry 504 may encode the audio and video into data formats suitable for processing by video chat client device 500.

Audio/video capture circuitry 504 transmits 506 the captured audio and video of the participant to control circuitry 508, where it is received using media processing circuitry 510. Control circuitry 508 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Audio/video capture circuitry 504 also transmits 512 at least one image of the participant to memory 514. The image may be a still image or a video frame extracted from the captured video of the participant. Memory 514 may be an electronic storage device. As referred to herein, the phrase "electronic storage device" or "storage device" should be understood to mean any device for storing electronic data, such as random-access memory, read-only memory, hard drives, optical drives, solid state devices, quantum storage devices, or any other suitable fixed or removable storage devices, and/or any combination of the same.

Video chat client device 500 may monitor a network connection with a video service node (e.g., video service node 400). For example, network connection monitoring circuitry 516 may evaluate connection parameters of the connection. Network connection monitoring circuitry 516 may transmit 518 a request to transceiver circuitry 520 for data describing the connection. Transceiver circuitry 520 comprises a network connection over which data can be transmitted to and received from remote devices, such as an ethernet connection, Wi-Fi connection, mobile broadband interface, or connection employing any other suitable networking protocol. Transceiver circuitry 520 may, for example, transmit a ping to the video service node and measure an elapsed time between transmission and receipt of an acknowledgement from the video service node. Alternatively or additionally, network connection monitoring circuitry 516 may transmit a packet or set of packets totaling a known quantity of data to a server and measure the amount of time required to transmit all of the data. Network connection monitoring circuitry 516 receives 522 the data describing the connection and may compare one or more parameters of a connection with one or more corresponding thresholds. For example, network connection monitoring circuitry 516 may compare the upload connection speed of the connection to a threshold connection speed required to maintain smooth video of the participant.

If network connection monitoring circuitry 516 determines, based on the data received describing the connection, that the connection is experiencing network conditions that adversely affect the quality of media being transmitted to the video service node, control circuitry 508 determines that a digital twin data stream should be transmitted to the video service node due to the reduced data transmission requirements when compared to a video stream. Control circuitry 508 instructs digital twin synthesis circuitry 524 to begin generating digital twin data. Digital twin synthesis circuitry 524 transmits 526 a request to memory 514 for the stored image of the participant. Digital twin synthesis circuitry 524 receives 528 the stored image and uses it as the basis for the digital twin. For example, digital twin synthesis circuitry 524 may generate vectors describing different portions of the image, such as the participant's mouth, eyes, etc.

Digital twin synthesis circuitry 524 then generates a set of vector modifications for each portion of the image to recreate an approximation of the participant's appearance. Digital twin synthesis circuitry 524 requests 530 media data from media processing circuitry 510. After receiving 532 the media data, digital twin synthesis circuitry 524 analyzes how each portion of the participant's appearance changes. Digital twin synthesis circuitry 524 then generates a data stream of vector modifications or other type of modifications to the image of the participant needed to generate a digital twin. The data stream is synchronized with audio data received from the participant.

Digital twin synthesis circuitry 524 transmits 534 the data stream to media processing circuitry 510. Media processing circuitry 510 encodes the audio data from the participant and the data stream from digital twin synthesis circuitry 524 into a single media stream. Media processing circuitry 510 then transmits 536 the media stream to transceiver circuitry 520. In some embodiments, digital twin synthesis circuitry 524 transmits 538 the data stream directly to transceiver circuitry 520. Transceiver circuitry 520 in turn transmits 540 the media stream, or the audio and data streams, to the video service node.

Figure 6:
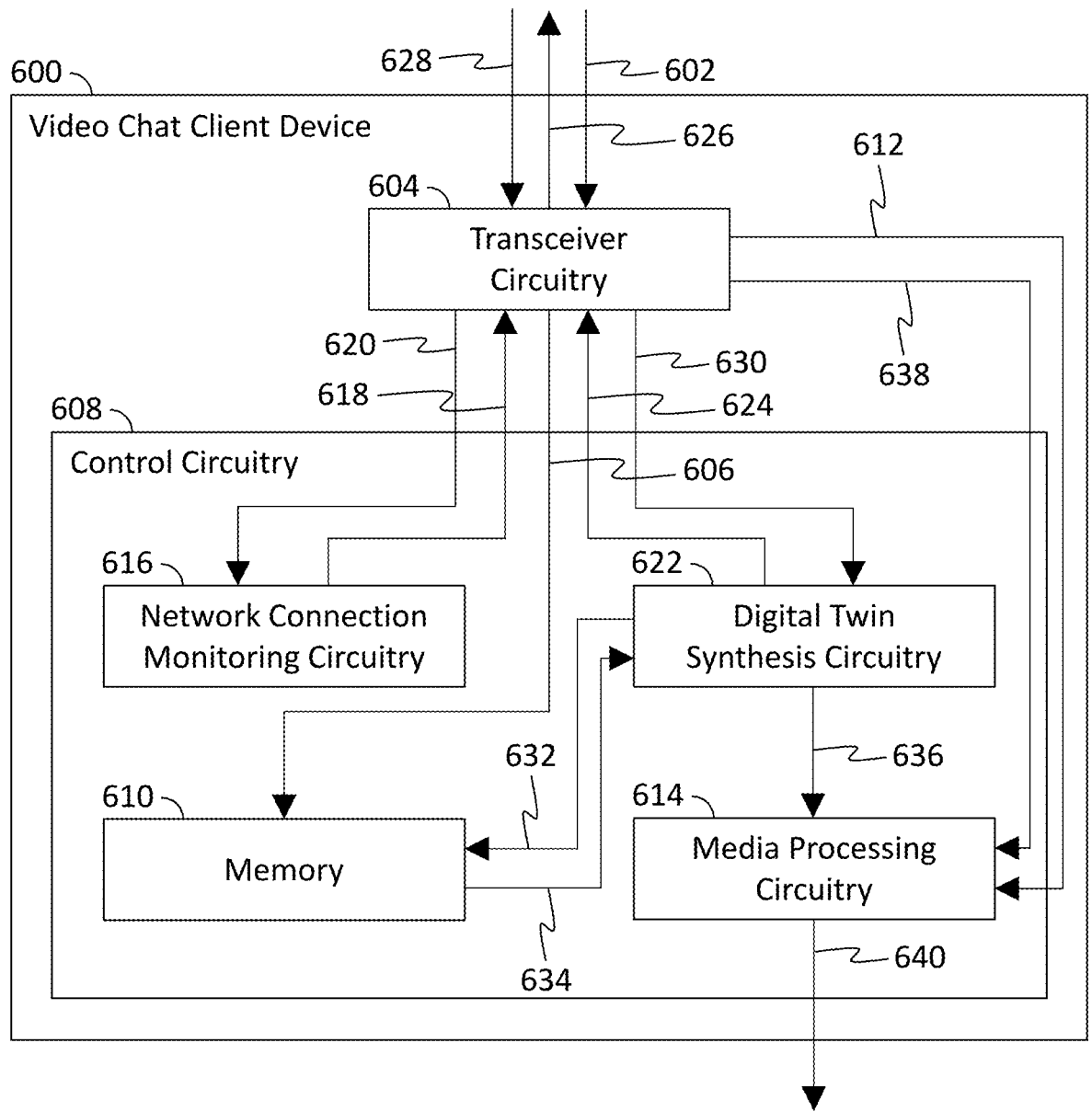
FIG. 6 is a block diagram showing components and dataflow therebetween of a video chat client device configured to render a digital twin of a speaker, in accordance with some embodiments of the disclosure.

FIG. 6 is a block diagram showing components and dataflow therebetween of a video chat client device configured to render a digital twin of a speaker, in accordance with some embodiments of the disclosure. Video chat client device 600 receives 602 a media stream from a video service node (e.g., video service node 400) comprising audio and video data of at least one other participant in a video call, as well as a high-quality image of the at least one other participant. The media stream is received using transceiver circuitry 604. Transceiver circuitry 604 comprises a network connection over which data can be transmitted to and received from remote devices, such as an ethernet connection, Wi-Fi connection, mobile broadband interface, or connection employing any other suitable networking protocol. Transceiver circuitry 604 transmits 606 the high-quality image or images to control circuitry 608 for storage in memory 610. Memory 610 may be an electronic storage device. As referred to herein, the phrase "electronic storage device" or "storage device" should be understood to mean any device for storing electronic data, such as random-access memory, read-only memory, hard drives, optical drives, solid state devices, quantum storage devices, or any other suitable fixed or removable storage devices, and/or any combination of the same. Transceiver circuitry 604 also transmits 612 the media stream to media processing circuitry 614 for decoding and output to the participant.

Video chat client device 600 may monitor a network connection with a video service node (e.g., video service node 400). For example, network connection monitoring circuitry 616 may evaluate connection parameters of the connection. Network connection monitoring circuitry 616 may transmit 618 a request to transceiver circuitry 604 for data describing the connection. Transceiver circuitry 604 may, for example, transmit a ping to the video service node and measure an elapsed time between transmission and receipt of an acknowledgement from the video service node.

Alternatively or additionally, network connection monitoring circuitry 616 may transmit a packet or set of packets totaling a known quantity of data to a server and measure the amount of time required to transmit all of the data. Network connection monitoring circuitry 616 receives 620 the data describing the connection and may compare one or more parameters of a connection with one or more corresponding thresholds. For example, network connection monitoring circuitry 616 may compare the upload connection speed of the connection to a threshold connection speed required to maintain smooth video of the participant.

If network connection monitoring circuitry 616 determines, based on the data received describing the connection, that the connection is experiencing network conditions that adversely affect the quality of media being received from the video service node, control circuitry 608 determines that a digital twin should be rendered for at least one other participant due to the reduced data transmission requirements for a digital twin when compared to a video stream. Control circuitry 608 instructs digital twin synthesis circuitry 622 to generate a digital twin for at least one other participant. Digital twin synthesis circuitry 622 transmits 624 a request for digital twin data to transceiver circuitry 604, which in turn transmits 626 the request to the video service node.

Video chat client device 600 receives 628, using transceiver circuitry 604, the requested digital twin data stream for the at least one other participant. Transceiver circuitry 604 transmits 630 the digital twin data stream to digital twin synthesis circuitry 622. Digital twin synthesis circuitry 622 then transmits 632 a request to memory 610 for the stored image or images of the at least one other participant. Digital twin synthesis circuitry 622 receives 634 the stored image or images and uses them as the basis for each respective digital twin of the corresponding participant.

Digital twin synthesis circuitry 622 may generate vectors describing different portions of each image, such as the depicted participant's mouth, eyes, etc. Digital twin synthesis circuitry 622 then generates a set of vector modifications for each portion of each image to recreate an approximation of the respective participant's appearance. Digital twin synthesis circuitry 622 may use audio data received from the respective participant to determine the respective participant's appearance based on past video data.

Digital twin synthesis circuitry 622 modifies the image of the respective participant by modifying each vector in accordance with the speech of the participant. Digital twin synthesis circuitry 622 then renders video frames comprising modified versions of the image to create a video stream that approximates the appearance of the participant. Digital twin synthesis circuitry 622 transmits 636 the rendered video to media processing circuitry 614. Media processing circuitry 614 then combines the rendered video stream with audio data received 638 from the participant into a single media stream. Media processing circuitry 614 then outputs 640 the audio and rendered digital twin to the participant.

Figure 7:
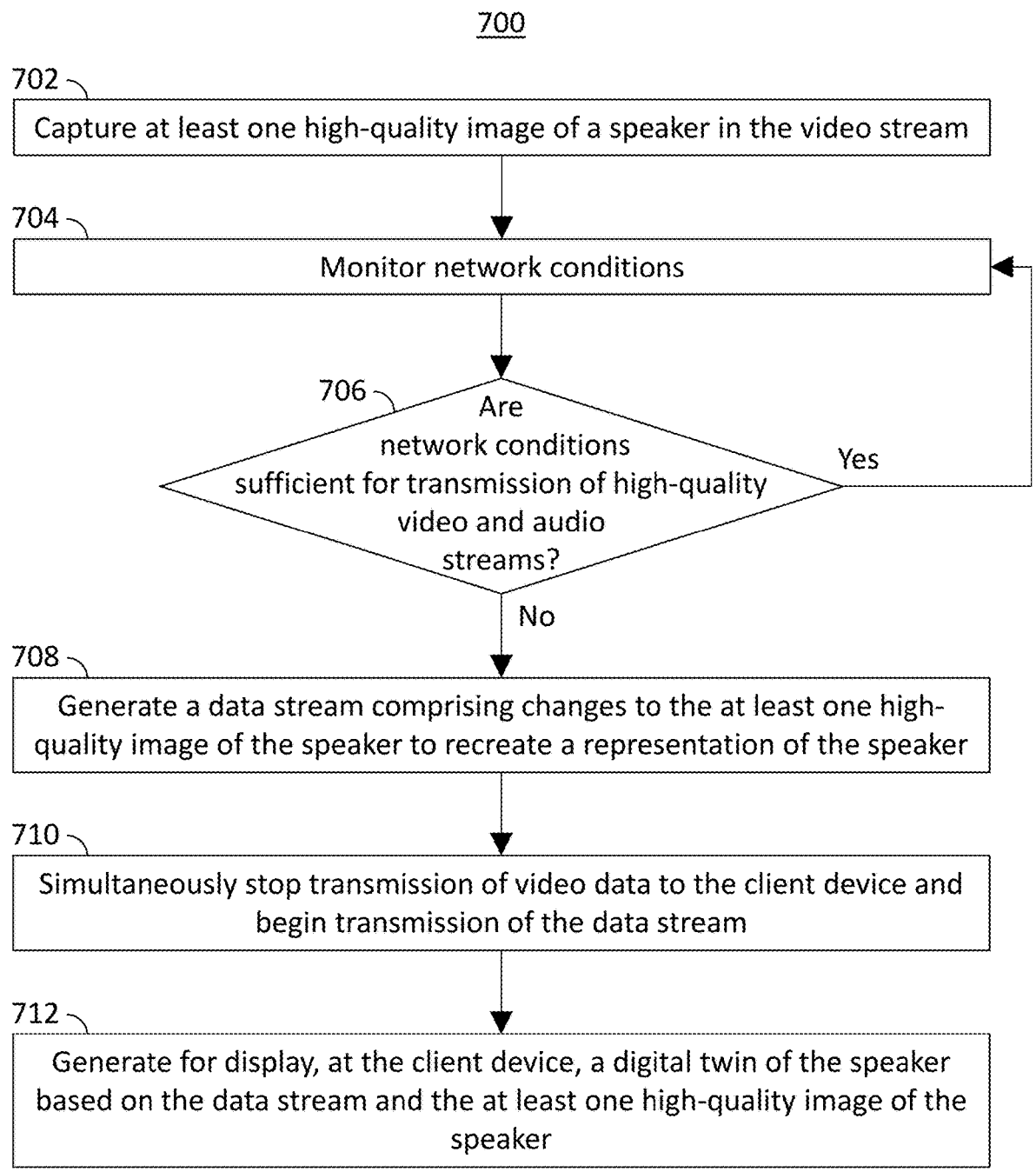
FIG. 7 is a flowchart representing an illustrative process for generating a digital twin of a speaker, in accordance with some embodiments of the disclosure.

FIG. 7 is a flowchart representing an illustrative process 700 for generating a digital twin of a speaker, in accordance with some embodiments of the disclosure. Process 700 may be implemented on control circuitry 408, control circuitry 508, or control circuitry 608. In addition, one or more actions of process 700 may be incorporated into or combined with one or more actions of any other process or embodiment described herein.

At 702, the control circuitry captures at least one high-quality image of a speaker in the video stream. If this process is executed at the video service node (e.g., video service node 400), then control circuitry 408 receives a high-quality image of the speaker from the corresponding video chat client device (e.g., video chat client device 500). If this process is executed at a video chat client device (e.g., video chat client device 500), the high-quality image may be captured separately from the video stream, supplied by the speaker (e.g., stored in a profile of the speaker) or extracted from captured video of the speaker.

At 704, the control circuitry monitors network conditions. The control circuitry may periodically transmit pings or data packets to a server or between the video service node and video chat client device and measure the elapsed time between transmission and receipt of an acknowledgement message or completion of the data transmission. If the video chat client device is a mobile device, the control circuitry may monitor the type of network connection currently in use (e.g., 3G, 4G, 4G LTE, 5G, Wi-Fi, etc.).

At 706, the control circuitry determines whether network conditions are sufficient for transmission of high-quality video and audio stream. For example, the control circuitry may compare the elapsed time for a ping to a threshold amount of time. If the elapsed time is faster than the threshold amount of time, then the network conditions are sufficient. If the video chat client is a mobile device, the type of network connection may be compared to a list of network connection types that are capable of supporting a high-quality video and audio stream. If the network connection type is not capable of supporting a high-quality video and audio stream, then the network conditions are not sufficient.

If network conditions are sufficient ("Yes" at 706), then processing returns to 704 and the control circuitry continues monitoring network conditions. If network conditions are not sufficient for transmission of high-quality video and audio streams ("No" at 706), then, at 708, the control circuitry generates a data stream comprising changes to the at least one high-quality image of the speaker to recreate a representation of the speaker. The captured high-quality image of the speaker is retrieved and used as a basis for generating the data stream. The control circuitry may generate vectors describing different portions of the image, such as the speaker's mouth, eyes, etc. The control circuitry then generates a set of vector modifications for each portion of the image to recreate an approximation of the speaker's appearance. The control circuitry generates a data stream of the vector modifications or other type of modifications to the image of the participant, synchronized with the audio data from the speaker.

At 710, the control circuitry simultaneously stops transmission of video data to the client device and begins transmission of the data stream. If this process is executed at the video service node, control circuitry 400 refrains from including video data in transmissions to the affected video chat client device. If this process is executed at the video chat client device, the control circuitry may transmit a request to the video service node for digital twin data in place of video data.

At 712, the control circuitry generates for display, at the client device, a digital twin of the speaker based on the data stream and the at least one high-quality image of the speaker. The control circuitry renders, based on the high-quality image of the speaker and the data stream, a video representation of the speaker. If this process is executed at the video service node, the rendered video is transmitted to other video chat client devices along with audio of the speaker. If this process is executed at a video chat client device that is experiencing downstream network conditions, the control circuitry outputs the rendered video.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
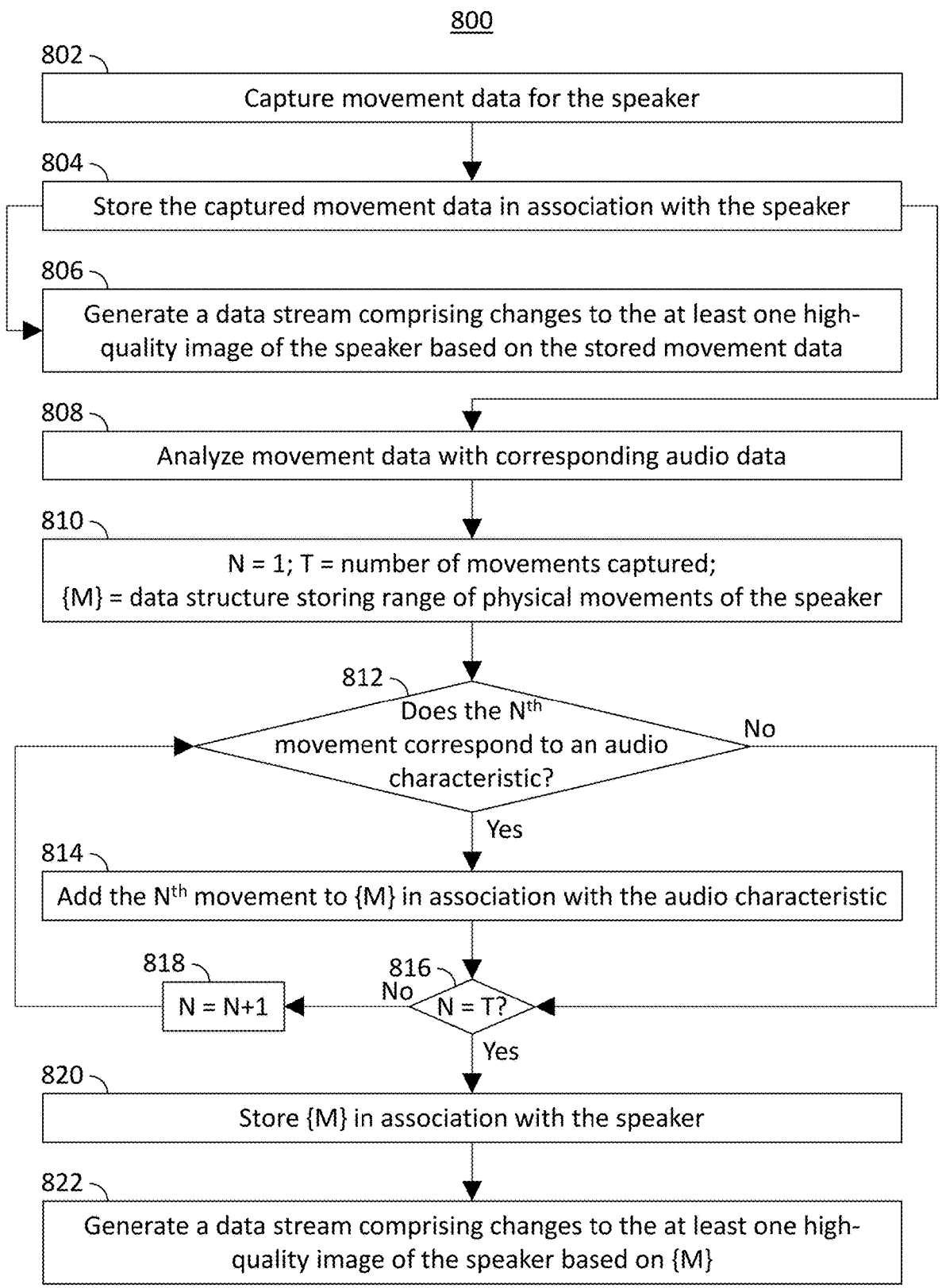
FIG. 8 is a flowchart representing an illustrative process for generating a data stream enabling digital twin synthesis of a speaker, in accordance with some embodiments of the disclosure.

FIG. 8 is a flowchart representing an illustrative process 800 for generating a data stream enabling digital twin synthesis of a speaker, in accordance with some embodiments of the disclosure. Process 800 may be implemented on control circuitry 408, control circuitry 508 or control circuitry 608. In addition, one or more actions of process 800 may be incorporated into or combined with one or more actions of any other process or embodiment described herein.

At 802, the control circuitry captures movement data for the speaker. For example, the control circuitry may compare successive frames of video of the speaker to determine a speed and direction of movement for all or part of the speaker. This may be accomplished by comparing pixel color values or by using image recognition techniques to identify specific portions of the speaker (e.g., eyes, nose, hand) in each frame. At 804, the control circuitry stores the captured movement data in association with the speaker. The control circuitry may have access to a database or other data structure in which movement data may be stored in association with a specific speaker, such as in a user profile. In some embodiments, processing moves to 806 where the control circuitry generates a data stream comprising changes to the at least one high-quality image of the speaker based on the stored movement data. That is, the stored movement data is used directly in generating the data stream.

In some embodiments, after storing the movement data at 804, processing instead proceeds to 808, where the control circuitry analyzes the movement data with corresponding audio data. For example, the control circuitry may compare the movements of the speaker with audio characteristics of the speaker's speech patterns. At 810, the control circuitry initializes a counter variable N, setting its value to one, a variable T representing the number of movements for which movement data has been captured, and a data structure {M} in which a range of physical movements of the speaker may be stored.

At 812, the control circuitry determines whether the $N^{th}$ movement corresponds to an audio characteristic. For example, the speaker, or portion of the speaker's body, may move in a specific way every time the speaker asks a question. The speaker may also use a specific inflection or vocal modulation when asking questions. The control circuitry may detect a correlation between the movement and the audio characteristics of the speech.

If the $N^{th}$ movement does correspond to an audio characteristic ("Yes" at 812), then, at 814, the control circuitry adds the movement to {M} in association with the audio characteristic. For example, a vector, or a set of coordinates at which the speaker or portion of the speaker's body starts and ends, along with the speed or time taken to move from the start coordinates to the end coordinates may be stored in {M}, along with an indication of the audio characteristic, such as a waveform, audio sample, start and end frequencies of the audio, or other data representing the audio characteristic.

After storing the $N^{th}$ movement in {M}, or if in $N^{th}$ movement does not correspond to an audio characteristic, at 816, the control circuitry determines whether N is equal to T, meaning that all captured movements have been processed. If N is not equal to T ("No" at 816), then, at 818, the control circuitry increments the value of N by one and processing returns to 812. If N is equal to T ("Yes" at 816), then, at 820, the control circuitry stores {M} in association with the speaker. For example, the control circuitry may store {M} in a user profile of the speaker.

At 822, the control circuitry generates a data stream comprising changes to the at least one high-quality image of the speaker based on {M}. The range of physical movements stored in {M} may be used, along with the audio of the speaker, to determine how the image of the speaker should be modified to approximate a representation of the speaker.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of maintaining a video stream in a low network quality environment using a digital twin, the method comprising;
   capturing at least one high-quality image of a speaker in the video stream;
   detecting a low network quality condition between a client device and a video service node; and
   in response to detecting the low network quality condition between the client device and the video service node:
      generating a data stream comprising changes to the at least one high-quality image of the speaker to recreate a representation of the speaker;
      simultaneously stopping transmission of video data to the client device and beginning transmission of the data stream; and
      generating for display, at the client device, a digital twin of the speaker based on the data stream and the at least one high-quality image of the speaker.

2. The method of claim 1, wherein capturing at least one high-quality image of the speaker further comprises periodically storing a video frame from the video stream in which the speaker is depicted.

3. The method of claim 1, wherein detecting the low network quality condition comprises:
   monitoring available bandwidth for the client device; and
   determining, based on the monitoring, that the available bandwidth is below a threshold bandwidth.

4. The method of claim 1, wherein detecting the low network quality condition comprises determining that a video buffer depth is below a threshold buffer depth.

5. The method of claim 1, wherein detecting the low network quality condition comprises:

monitoring latency of the video stream; and determining, based on the monitoring, that the latency exceeds a threshold latency.

6. The method of claim 1, further comprising:

capturing movement data for the speaker; and storing a range of physical movements, based on the movement data, for the speaker.

7. The method of claim 6, wherein generating the data stream is based on the captured movement data for the speaker.

8. The method of claim 6, wherein generating the data stream is based on the stored range of physical movements for the speaker.

9. The method of claim 1, wherein generating for display, at the client device, a digital twin of the speaker further comprises:

rendering, at the video service node, the digital twin; and transmitting, from the video service node to the client device, the rendered digital twin for display.

10. The method of claim 1, wherein generating for display, at the client device, a digital twin of the speaker further comprises rendering, at the client device, the digital twin for display.

11. The method of claim 1, further comprising:

generating movement data for the speaker based on audio data received from the speaker;

wherein generating the data stream is based on the generated movement data.

12. A system of maintaining a video stream in a low network quality environment using a digital twin, the system comprising;

memory; and control circuitry configured to:

capture at least one high-quality image of a speaker in the video stream;

store the at least one high-quality image in the memory;

detect a low network quality condition between a client device and a video service node; and in response to detecting the low network quality condition between the client device and the video service node:

generate a data stream comprising changes to the at least one high-quality image of the speaker to recreate a representation of the speaker;

simultaneously stop transmission of video data to the client device and begin transmission of the data stream; and generate for display, at the client device, a digital twin of the speaker based on the data stream and the at least one high-quality image of the speaker.

13. The system of claim 12, wherein the control circuitry configured to capture at least one high-quality image of the speaker is further configured to periodically store, in the memory, a video frame from the video stream in which the speaker is depicted.

14. The system of claim 12, wherein the control circuitry configured to detect the low network quality condition is further configured to:

monitor available bandwidth for the client device; and determine, based on the monitoring, that the available bandwidth is below a threshold bandwidth.

15. The system of claim 12, wherein the control circuitry configured to detect the low network quality condition is further configured to determine that a video buffer depth is below a threshold buffer depth.

16. The system of claim 12, wherein the control circuitry configured to detect the low network quality condition is further configured to:

monitor latency of the video stream; and determine, based on the monitoring, that the latency exceeds a threshold latency.

17. The system of claim 12, wherein the control circuitry is further configured to:

capture movement data for the speaker; and store, in the memory, a range of physical movements, based on the movement data, for the speaker.

18. The system of claim 17, wherein the control circuitry configured to generate the data stream is further configured to do so based on the captured movement data for the speaker.

19. The system of claim 17, wherein the control circuitry configured to generate the data stream is further configured to do so based on the stored range of physical movements for the speaker.

20. The system of claim 12, wherein the control circuitry configured to generate for display, at the client device, a digital twin of the speaker is further configured to:

render, at the video service node, the digital twin; and transmit, from the video service node to the client device, the rendered digital twin for display.

21. The system of claim 12, wherein the control circuitry configured to generate for display, at the client device, a digital twin of the speaker is further configured to render, at the client device, the digital twin for display.

22. The system of claim 12, wherein the control circuitry is further configured to:

generate movement data for the speaker based on audio data received from the speaker;

wherein the control circuitry configured to generate the data stream is further configured to do so based on the generated movement data.

* * * * *